INVENTOR.
John F. Beckerich
BY Moody and Antrim
Agents

INVENTOR.
John F. Beckerich
BY Moody and Antrim
Agents

United States Patent Office 3,204,125

Patented Aug. 31, 1965

3,204,125

PHASE SYNCHRONIZED SIGNAL SAMPLER

John F. Beckerich, Richardson, Tex., assignor to Collins Radio Company, Cedar Rapids, Iowa, a corporation of Iowa Filed Apr. 1, 1963, Ser. No. 269,530
3 Claims. (Cl. 307—88.5)

This invention relates to modulator or to detector circuits and particularly pertains to synchronized short-circuit switches that reduce undesired quadrature signal.

In signal circuits such as servo control circuits, undesirable signal voltage that is out-of-phase with desired signal voltage may be present. A high proportion of the energy of an alternating-current signal may be obtained by sampling the signal for a relatively small portion of each wave when the sampling periods are synchronized with the crests of the signal. For example compared with the power that can be obtained by sampling a complete waveform, the power of the signal is down only about 3 decibels when a sine wave signal is sampled 50 percent of the time. Conversely, a relatively small amount of power is obtained when signal is sampled about its zero crossings. In signal or control circuits in which the original waveform need not be retained exactly, most of the energy can be obtained from a desired signal by sampling it during its crest, and the energy of an undesired signal that differs in phase by about 90 degrees is greatly decreased. The undesired signals that differ in phase from the desired signals by about 90 degrees are called quadrature signals in this description.

The detector or sampling circuit of this invention comprises two short-circuiting branches connected in parallel across the input of a circuit to which both desired and quadrature signal are being applied. The branches contain transistors that have synchronized periods of conduction to short circuit the input when the undesired quadrature signal has maximum amplitude. Circuits for controlling the conduction of the transistors include a timing capacitor and resistor. Voltage in quadrature phase with the desired voltage is applied to the control circuits to cause the parallel short-circuiting branches to become conductive alternately to correspond to alternate crossover periods of the desired signal. Undesired quadrature voltage in the signal circuit is short circuited while the transistors are conductive. The duration of the period of conductivity for determining the duration of sampling periods is determined by the time constants of the capacitive control circuits. The timing control circuits develop direct-current voltages to bias the transistors toward cut-off as a result of the diode rectifier function of the base-emitter circuits of the transistors.

An object of this invention is to provide a crest sampling circuit that is simpler than known prior circuits.

A feature of the invention is the use of capacitive timing circuits as the control circuits of the short-circuiting transistors.

Figure 1:
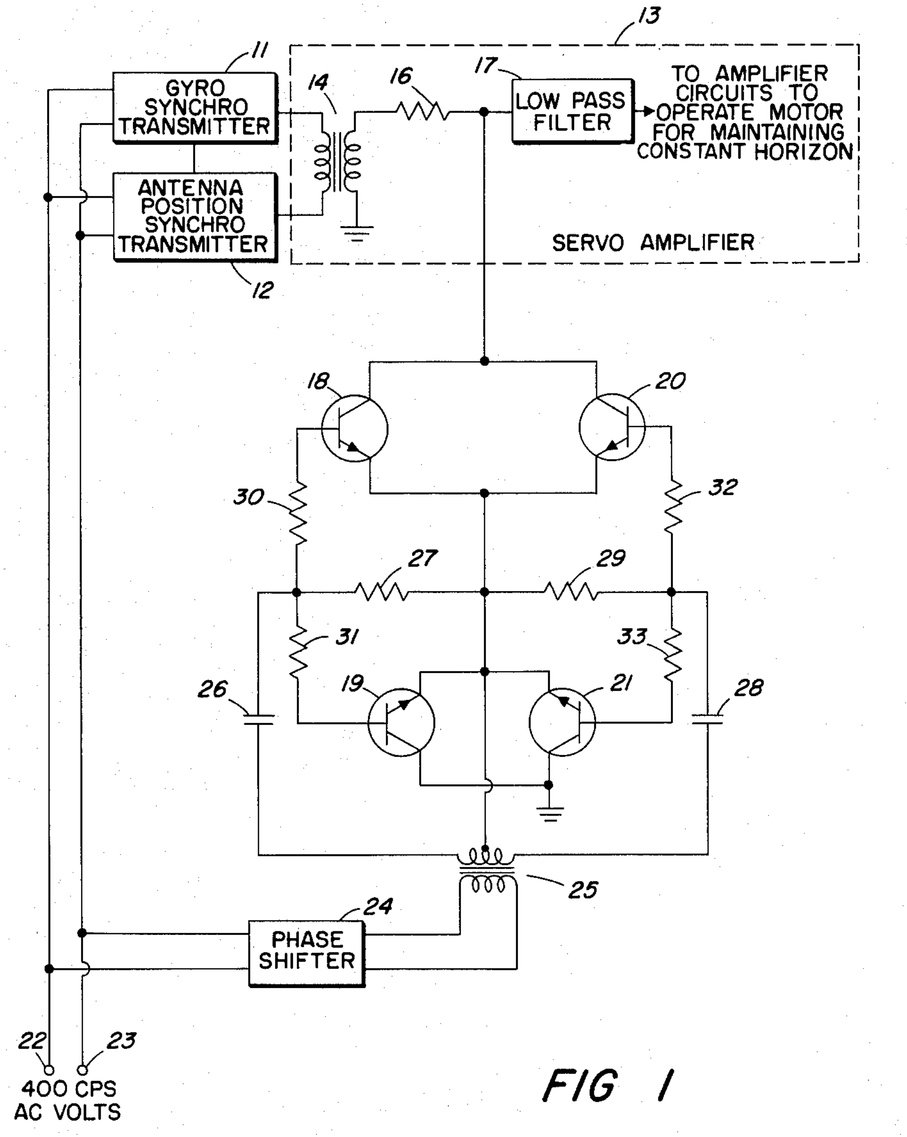
Figure 2:
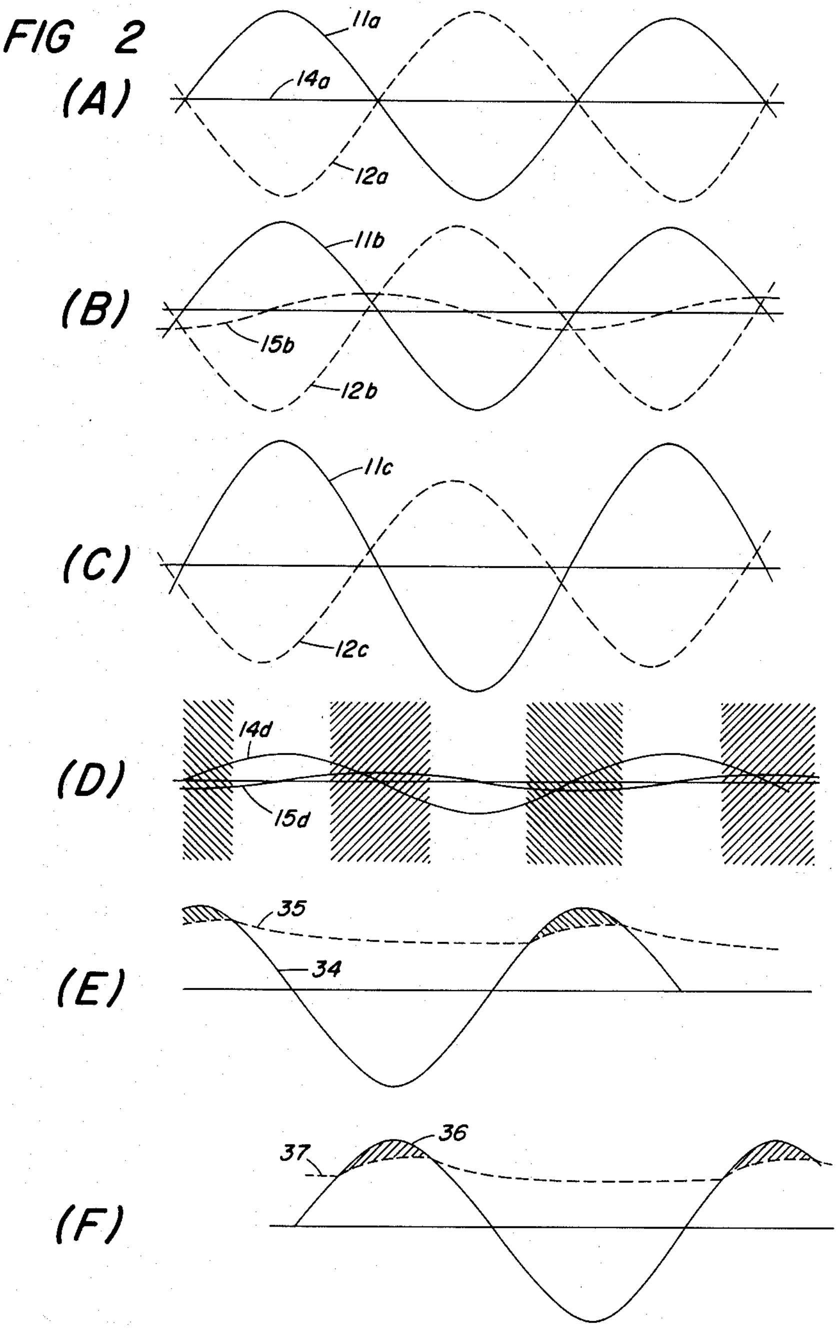

The following description may be more readily understood with reference to the accompanying drawings in which:

FIG. 1 is a schematic diagram of the signal sampling circuit of this invention; and FIG. 2 is a series of waveform diagrams (A)–(F) to demonstrate the sampling of a desired signal as shown in (D) at periods for eliminating substantially all of the quadrature signal.

In FIG. 1, the signal sampling circuit of this invention is shown applied to a servo system that controls the scanning sweep of an antenna in a weather radar system. The antenna is mounted in the nose of an aircraft fuselage and sweeps horizontally through a predetermined arc at a constant rate while the radar is in use. The servo system is utilized to control the attitude of the sweep axis of the antennas so that the direction of sweep is horizontal regardless of the attitude of the aircraft. In practice a gyro controls a bank sensing synchro transmitter and a pitch sensing synchro transmitter. The outputs of the two transmitters are applied to a resolver that has its rotor coupled to the mounting axis of the antenna. For simplification, the system shown in FIG. 1 shows only one gyro synchro transmitter 11 that is substituted for the resolver. The simplified circuit for sensing either bank or pitch illustrates fully the problem of eliminating quadrature signal. The synchro transmitters 11 and 12 are connected in series to the input of the servo amplifier 13 to control the direction of sweep. The gyro synchro transmitter 11 is coupled to a horizontal gyro (not shown) to sense the attitude of the aircraft, and antenna position synchro transmitter 12 is coupled to the mounting axis of the antenna (not shown) to sense the direction of sweep relative to the mounting of the antenna.

When the sweep is horizontal, the angle of the sweep axis is equal to the attitude of the aircraft, and the rotor of the gyro synchro transmitter 11 and the rotor of the antenna position synchro transmitter 12 are positioned so that the output voltages of the transmitters are equal. The transmitters are connected in series and their combined output is connected to the primary of the servo input transformer 14. The polarities of the voltages that are added are such that they cancel when they have equal amplitudes. As shown in FIG. 2(A), the voltage 11a that is supplied by the transmitter 11 is combined with the voltage **12*a* that is supplied by the transmitter 12 to provide a null voltage 14*a* at the input of transformer 14**.

Each of the synchros is the conventional type that supplies an output voltage that is directly proportional to the displacement of the rotor from a normal position and has a polarity determined by the direction of the displacement. Strictly, synchros of this type are voltage devices in that changes of position are indicated by changes in output voltages. Ideally, the phase of the output is independent of the position of the rotor except that which appears as a phase reversal of 180 degrees caused by different directions of departure from the normal position.

However, undesired phase shift of a few degrees between the input voltage and the output voltage of the synchros often exists in spite of precision manufacturing. When the synchros are not matched in phase characteristics, a quadrature component that cannot be balanced out in a series circuit arrangement is present. As shown in FIG. 2(B), the output voltage **12*b* of the transmitter 12 is shifted in phase slightly relative to the output voltage 11*b* of the transmitter 11. Although these voltages that are equal in amplitude are added, an undesirable quadrature voltage component 15*b* is present and is applied to the input of the servo transformer 14**.

When the rotors of the synchro transmitters are not in corresponding positions because the angle of the antenna sweep is not equal to the attitude of the aircraft, the output voltage of one of the synchro transmitters 11 and 12 will be greater than that of the other. For example, in FIG. 2(C) the output voltage **11*c* of transmitter 11 is shown greater than the output voltage 12*c* of transmitter 12. The addition of the voltages of FIG. 2(C) will produce the error voltage 14*d* as shown in FIG. 2(D) for application to the input servo transformer 14. When voltages 11*c* and 12*c* are shifted slightly in phase, the quadrature component 15*d*** as shown in FIG. 2(D) is also present. Most of the power from the desired error control signal 14*d* can be obtained for application to the transformer 14 by sampling the voltage 14*d* during periods when the voltage is near maximum.

According to FIG. 2(D), the crest of the voltage 14*d* is sampled during 50 percent of the wave period that is not shown shaded. When the voltage is being sampled, signal is applied from the secondary of transformer 14 through resistor 16 and low-pass filter 17 to the input of amplifier circuits that control a servo motor. The position of the servo motor controls the position of the radar antenna to which is connected the antenna position synchro transmitter 12 During periods that correspond to the shaded portions of FIG. 2(D) the signal at the junction of resistor 16 and low-pass filter 17 is short circuited to ground through one of two parallel branches of the sampling control circuit that contains transistors 18–21. The conductivity of the transistors is controlled by a control circuit that receives power either from the same alternating current source as that which supplies power to the synchronous transmitters 11 and 12, or from a source that has its voltage synchronized with that supplied to the synchronous transmitters.

In FIG. 1, a source of 400 c.p.s. alternating-current voltage is shown connected to terminals 22 and 23 that supply voltage to the synchro transmitters. The terminals are also connected through a phase shifter 24 to the primary winding of a transformer 25. The phase shifter shifts the control voltage approximately 90 degrees as shown in FIG. 2(E) with respect to the voltage supplied from the synchro transmitters as shown in FIG. 2(D). The secondary winding of the transformer 25 is center tapped and the voltage between the center tap and one of the outer terminals of the winding is supplied to the bias control circuit or capacitive timing circuit of each one of the short-circuiting branches of the sampling control circuit. Since each branch is made conductive during application of voltage of one polarity and, therefore, conductive on alternate half-cycles, functioning of both branches provides short-circuiting intervals that are one-half period part. A capacitor 26 is connected to one outer terminal of the secondary winding and is connected in series with a discharging resistor 27 that is connected to the center tap of the secondary winding. Likewise, capacitor 28 and resistor 29 are connected across the other one-half of the secondary winding.

The base of the transistor 18 and the base of the transistor 19 are connected through current limiting resistors 30 and 31 respectively to the junction of capacitor 26 and resistor 27 to apply to these bases the alternating-current voltage developed across one-half of the secondary winding of transformer 25 plus the direct-current voltage developed across capacitor 26. Likewise, the bases of transistors 20 and 21 are connected through resistors 32 and 33 respectively to the junction of capacitor 28 and resistor 29 to apply alternating-current voltage from transformer 25 plus the direct-current voltage developed across capacitor 28. The alternating-current components of the voltages that are applied to the bases of the transistors in the different branches are 180 degrees out of phase. The emitter-to-collector circuits of the transistors 18 and 19 are connected in series, and the series circuit is connected between the input of the low-pass filter 17 and the common return circuit or ground. The transistors shown are the NPN type; however, by reversing connections in a manner obvious to those skilled in the art, the type PNP might be used.

In operation, when the rotor of the gyro synchro transmitter 11 does not correspond in position to the rotor of the antenna position synchro transmitter 12, a difference voltage represented by the waveform 14*d* of FIG. 2(D) is applied through transformer 14 and resistor 16 to the input of the low-pass filter 17 of the servo amplifier. When the transmitters are not exactly matched, quadrature voltage 15*b* is present as previously described. Since the voltage cannot be completely eliminated, an exact null voltage that is required for stopping the servo system at the desired point cannot be obtained. This error in servo positioning is substantially eliminated when the waveform is sampled according to the periods represented in FIG. 2(D).

Assume that the phase of the voltage that is supplied from the secondary winding of transformer 25 is such that the voltage applied from the outer terminal to the series capacitor 26 is represented by waveform 34 of FIG. 2(E). When the positively rising voltage exceeds the direct-current voltage 35 on the capacitor 26, the base-to-emitter circuits of transistors 18 and 19 become conductive, and current flows from the capacitor through resistors 30 and 31 and the respective base-to-emitter circuits to ground. The circuit, therefore, performs as the usual half-wave rectifier to maintain a direct-current charge on capacitor 26. While the capacitor 26 is charging through the base-to-collector circuits of transistors 18 and 19, the transistors are conductive to provide a low resistance short circuit between the input of low-pass filter 17 and ground. The interval during which capacitor 26 is charging is shown by the shaded area at the crest of the waveform 34. The input of the low-pass filter 17 is, therefore, short circuited during the corresponding period shown in shading in FIG. 2(D). Both the desired voltage and the quadrature voltage are short circuited. The quadrature voltage is short circuited when it is maximum; the desired voltage is short circuited when it is near zero.

The capacitor 26 has increased its charge during this short-circuiting period, as shown by the slope of line 35 that is below the crest of the voltage waveform 34. When the voltage applied from the secondary winding of transformer 25 decreases below the voltage across capacitor 26, the transistors 18 and 19 are biased below cut-off until the next positive crest of the waveform 34. While the transistors are nonconductive, the capacitor 26 discharges slowly through the resistor 27. Likewise, the capacitor 28 charges when the alternate crest 36 of the secondary winding of transformer 25 is greater than the voltage 37 across capacitor 28 as indicated in FIG. 2(F). Since the charging periods are determined by the amount of charge retained on the respective capacitor during alternate crests of the control voltage, and the charge at those times is determined by the amount that the capacitor has discharged through a respective resistor 27 or 29 during the intervening period, the values of resistors 27 and 29 determine the charging periods of capacitors 26 and 28 respectively, and therefore, determine the duration of the periods that the respective transistor emitter-collector circuits are conductive to short circuit the error signal voltage that is applied to the input of the servo amplifier.

Although this invention has been shown with reference to a single embodiment, different types of transistors within the sampling control circuit may be connected in different configurations obvious to those skilled in the art and the circuit still be within the scope of the invention claimed below.

What is claimed is:

1. First and second signal circuits, said first signal circuit being coupled to said second signal circuit for supplying desired signal voltage to said second signal circuit, said first signal circuit containing an undersired voltage in quadrature phase with respect to said desired signal voltage; a synchronized switching circuit having a short-circuiting path connected across said input of said second signal circuit, said short-circuiting path comprising at least a transistor having an emitter and a collector connected in series in said short-circuiting path, said transistor having a base responsive to application of voltage relative to said emitter to control the conductivity of said path, a capacitor connected to said base, means for applying through said capacitor alternating-current control voltage in synchronism with said signal voltage to said base relative to the emitter, said transistor functioning as a diode rectifier in the alternating-current control voltage circuit to charge said capacitor, the charge on said capacitor tending to bias said transistor beyond cut-off, and resistive means for discharging said capacitor at a desired rate to maintain the emitter-collector circuit of said short-circuiting path conductive during predetermined periods coincident with said crests of said control voltage for short-circuiting said input of said second circuit while said desired signal voltage is minimum and said undesired quadrature voltage is maximum.

2. First and second signal circuits, said first signal circuit being coupled to said second signal circuit for supplying desired signal voltage to said second signal circuit, said first signal circuit containing an undesired voltage in quadrature phase with respect to said desired signal voltage; a synchronized switching circuit having first and second parallel short-circuiting paths connected across said input of said second signal circuit, each of said short-circuiting paths comprising at least a transistor having an emitter and a collector connected in series in the respective path, each of said transistors having a base responsive to application of voltage relative to said emitter to control the conductivity of said respective short-circuiting path, a capacitor connected to said base of each of said short-circuiting paths, means for applying through each of said capacitors alternating-current control voltage in synchronism with said signal voltage to each of said respective bases relative to its emitter, said transistors functioning as diode rectifiers in the alternating-current control voltage circuit to charge said capacitors, the charge on said capacitors tending to bias said transistors beyond cut-off, and resistive means for discharging said capacitors at a desired rate to maintain the emitter-collector circuit of each of said short-circuiting paths conductive during predetermined periods coincident with alternate crests of said control voltage for short circuiting said input of said second circuit while said desired signal voltage is minimum and said undesired quadrature voltage is maximum.

3. In a servo system having first and second alternating-current synchro transmitters connected in series, a servo amplifier, a resistive element, and means for coupling said series synchro transmitters through said resistive element to said amplifier, said synchro transmitters normally supplying signal voltages that differ in phase by an amount that is near as practical to 180 degrees, said signal voltages being subject to slight inaccuracies in desired phase so that an undesired quadrature component exists to prevent null input voltage to said amplifier; a voltage sampling control circuit for controlling application of the combined voltages of said first and second transmitters to said servo amplifier comprising first, second, third, and fourth transistors each having an emitter-collector circuit and a base control circuit, said first and second transistors having their said respective emitter-collector circuits connected in series across the input of said servo amplifier and said third and fourth transistors also having their said respective emitter-collector circuits connected in series across said input, a first capacitive-resistive timing circuit connected to said base control circuits of said first and second transistors, a second capacitive-resistive timing circuit connected to said base control circuit of said third and fourth transistors, means to apply alternating-current voltages differing in phase by 180 degrees to said first and second timing circuits respectively, the voltages applied to said timing circuits being substantially in quadrature phase with said signal voltages supplied by said synchro transmitters, said transistors functioning as diode rectifiers with respect to said respective timing circuits to provide a direct-current voltage for biasing said transistors beyond cut-off except for a portion of each of the crests of said alternating-current voltage that is applied to said respective charging circuits, each of said series emitter-collector circuits becoming conductive in response to said last mentioned alternating current voltage exceeding said direct-current voltage to short circuit the input of said servo amplifier while said undesired quadrature component is maximum.

No references cited.

GEORGE N. WESTBY, *Primary Examiner.*

DAVID J. GALVIN, *Examiner.*